(12) United States Patent
Gupta et al.

(10) Patent No.: US 10,646,804 B2
(45) Date of Patent: May 12, 2020

(54) SYSTEM AND METHOD FOR CONDITIONING FLOW OF A WET GAS STREAM

(71) Applicant: General Electric Company, Schenectady, NY (US)

(72) Inventors: Jitendra Kumar Gupta, Bangalore (IN); Rene Du Cauze de Nazelle, Munich (DE); Carlo Maria Martini, Florence (IT); Massimiliano Cirri, II, Munich (DE)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 23 days.

(21) Appl. No.: 15/533,661

(22) PCT Filed: Nov. 24, 2015

(86) PCT No.: PCT/US2015/062308
§ 371 (c)(1),
(2) Date: Jun. 7, 2017

(87) PCT Pub. No.: WO2016/094079
PCT Pub. Date: Jun. 16, 2016

(65) Prior Publication Data
US 2017/0319995 A1    Nov. 9, 2017

(30) Foreign Application Priority Data

Dec. 12, 2014    (IN) .......................... 6267/CHE/2014

(51) Int. Cl.
*B01D 45/04*    (2006.01)
*B01F 5/06*    (2006.01)
(Continued)

(52) U.S. Cl.
CPC ............ *B01D 45/04* (2013.01); *B01F 5/0652* (2013.01); *B01F 5/0655* (2013.01);
(Continued)

(58) Field of Classification Search
CPC ............................... B01D 45/00; B01D 45/04
See application file for complete search history.

(56) References Cited

U.S. PATENT DOCUMENTS

| 4,125,226 A | 11/1978 | Nieuwkamp |
| 4,460,517 A | 7/1984 | Calaceto |
(Continued)

FOREIGN PATENT DOCUMENTS

| DE | 102007011205 A1 * | 9/2008 | ............ B01F 5/0646 |
| WO | 2001076764 A1 | 10/2001 | |

OTHER PUBLICATIONS

Tan et al., "Monodispersed microfluidic droplet generation by shear focusing microfluidic device", Journal of Sensors and Actuators B: Chemical, Science Direct, vol. 114, Issue 1, pp. 350-356, Mar. 30, 2006.
(Continued)

*Primary Examiner* — Robert A Hopkins
(74) *Attorney, Agent, or Firm* — Baker Hughes Patent Organization

(57) ABSTRACT

A flow conditioning device for conditioning a wet gas stream having a plurality of liquid droplets and a gas flow is presented. The flow conditioning device includes a first segment including a first convergent section configured to break the plurality of liquid droplets from a first size to a second size. Further, the flow conditioning device includes a second segment coupled to the first segment and including a second convergent section configured to break the plurality of liquid droplets from the second size to a third size.

17 Claims, 3 Drawing Sheets

(51) Int. Cl.
   *C10L 3/10*     (2006.01)
   *F04D 29/70*    (2006.01)
   *B05B 1/30*     (2006.01)
   *B05B 7/04*     (2006.01)

(52) U.S. Cl.
   CPC .......... *B05B 1/3013* (2013.01); *B05B 7/0433* (2013.01); *C10L 3/101* (2013.01); *F04D 29/706* (2013.01); *C10L 2290/46* (2013.01)

(56) References Cited

U.S. PATENT DOCUMENTS

| | | |
|---|---|---|
| 5,617,997 A | 4/1997 | Kobayashi et al. |
| 5,682,759 A * | 11/1997 | Hays .................. F03B 1/04 62/402 |
| 6,003,789 A | 12/1999 | Base et al. |
| 6,601,776 B1 | 8/2003 | Oljaca et al. |
| 8,302,880 B2 | 11/2012 | Clarke |
| 8,690,519 B2 | 4/2014 | Aalburg et al. |
| 2010/0147021 A1 | 6/2010 | Betting et al. |
| 2012/0063961 A1 | 3/2012 | Chan et al. |
| 2012/0201660 A1 | 8/2012 | Aalburg et al. |
| 2013/0121812 A1 | 5/2013 | Vogel et al. |

OTHER PUBLICATIONS

International Search Report issued in connection with corresponding PCT application PCT/US2015/062308 dated Mar. 10, 2016.

\* cited by examiner

SYSTEM AND METHOD FOR CONDITIONING FLOW OF A WET GAS STREAM

BACKGROUND

Embodiments of the present specification relate generally to a compressor, and more particularly to a system and method for conditioning flow of a wet gas stream that is provided to the compressor.

Typically in an oil and gas production system, natural gas is extracted from an oil and gas well and provided to one or more compressors in the production system. It may be noted that the natural gas is a wet gas having one or more liquid components in the form of droplets. These liquid droplets may have a significant amount of liquid volume fraction, which results in erosion or embrittlement of impellers in the compressors. Particularly, erosion is known to be a function of a relative velocity of the droplets during impact onto the compressor surfaces, droplet mass size, as well as the impact angle. Also, the erosion of the impellers disadvantageously results in performance degradation, reliability issues, reduced compressor lifetime, and increased maintenance requirements.

In a conventional system, a large tank known as a liquid-gas separator is positioned upstream of the compressors. This liquid-gas separator is used to separate the liquid droplets from a natural gas stream that is extracted from the oil and gas well. After separating the liquid droplets, the natural gas stream is provided to the compressors for further processing of the natural gas. However, currently available liquid separation systems and techniques tend to be complex, thereby resulting in exacerbation of maintenance issues related to the compressors and the system.

BRIEF DESCRIPTION

In accordance with aspects of the present specification, a flow conditioning device for conditioning a wet gas stream having a plurality of liquid droplets and a gas flow is presented. The flow conditioning device includes a first segment including a first convergent section configured to break the plurality of liquid droplets from a first size to a second size. Further, the flow conditioning device includes a second segment coupled to the first segment and including a second convergent section configured to break the plurality of liquid droplets from the second size to a third size.

In accordance with a further aspect of the present disclosure, a method for conditioning a wet gas stream is presented. The method includes receiving the wet gas stream including a plurality of liquid droplets having a first size and a gas flow. Further, the method includes conditioning, by a first convergent section of a flow conditioning device, the plurality of liquid droplets so as to reduce a size of the plurality of liquid droplets from the first size to a second size. Also, the method includes conditioning, by a second convergent section of the flow conditioning device, the plurality of liquid droplets so as to reduce the size of the plurality of liquid droplets from the second size to a third size.

In accordance with another aspect of the present disclosure, a system is presented. The system includes a compressor. Further, the system includes a flow conditioning device operatively coupled to an inlet of the compressor and including a first convergent section configured to receive a wet gas stream including a gas flow and a plurality of liquid droplets having a first size, and condition the plurality of liquid droplets so as to reduce a size of the plurality of liquid droplets from the first size to a second size. Also, the flow conditioning device includes a first divergent section coupled to the first convergent section and configured to decelerate the wet gas stream including the plurality of liquid droplets having the second size. Furthermore, the flow conditioning device includes a second convergent section coupled to the first divergent section and configured to condition the plurality of liquid droplets so as to reduce the size of the plurality of liquid droplets from the second size to a third size. In addition, the flow conditioning device includes a second divergent section coupled to the second convergent section and configured to decelerate the wet gas stream.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As will be described in detail hereinafter, various embodiments of exemplary systems and methods for conditioning a flow of a wet gas stream including a plurality of liquid droplets are presented. By employing the methods and the various embodiments of the systems of the present specification, erosion and/or embrittlement of impellers in the compressors may be substantially reduced. Also, by reducing the erosion in the compressors, performance, reliability, and lifetime of the compressors may be significantly improved.

Figure 1:
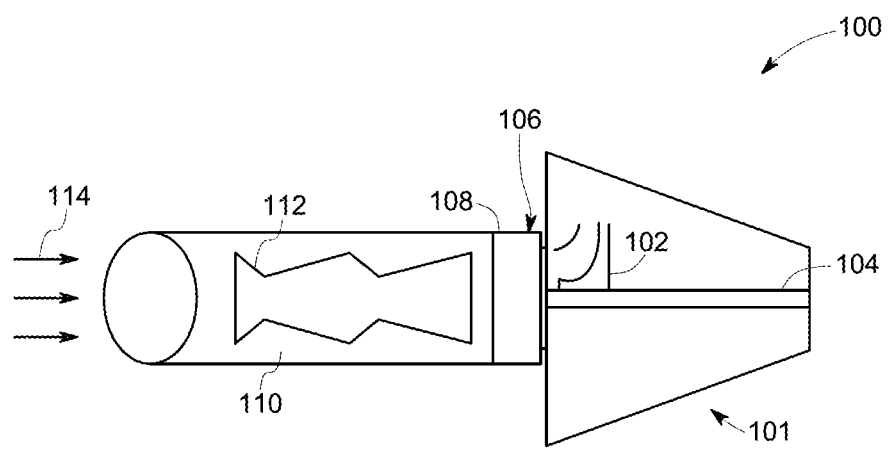
FIG. 1 is a diagrammatical representation of a wet gas compressor, in accordance with aspects of the present specification.

Turning now to the drawings and referring to FIG. 1, a flow conditioning system 100, in accordance with aspects of the present specification, is depicted. In a presently contemplated configuration, the flow conditioning system 100 includes a wet gas compressor 101. Furthermore, the flow conditioning system 100 includes one or more pipe sections 110 that are operatively coupled to the wet gas compressor 101 and configured to convey a wet gas stream 114 to the wet gas compressor 101.

The wet gas compressor 101 may be a part of an oil and gas production system that is used to extract natural gas from an oil and gas well and process the extracted natural gas to generate one or more by-products of the natural gas. The wet gas compressor 101 may include one or more stages with one or more impellers 102 positioned on a shaft 104 for rotation therewith. In addition, the wet gas compressor 101 may also include one or more stators. Also, the wet gas compressor 101 may include an inlet section 106. In one example, the inlet section 106 may include an inlet scroll 108. It may be noted that the wet gas compressor 101 may include other components, and is not limited to the components shown in FIG. 1.

Further, the pipe section 110 may be operatively coupled to the inlet section 106 of the wet gas compressor 101. The pipe section 110 may be of any desired size, shape, or length. Although the embodiment of FIG. 1 illustrates the flow conditioning system 100 as including one pipe section 110, any number of pipe sections 110 may be used. The pipe section 110 may be used for providing a natural gas stream 114 to the inlet section 106 of the wet gas compressor 101. It may be noted that the terms "natural gas stream" and "wet gas stream" may be used interchangeably in the present specification. Furthermore, the wet gas stream 114 may include a gas flow and a plurality of liquid droplets having a high liquid volume fraction.

In a conventional system, the wet gas stream is provided to the inlet section of the compressor. However, the liquid droplets in the wet gas stream are larger in size with a significant amount of liquid volume fraction. These large liquid droplets may cause erosion or embrittlement of impellers in the compressor when the wet gas stream at a high pressure impinges one or more surfaces of the impellers. This erosion or embrittlement of the impellers may in turn degrade the performance and lifetime of the compressor.

In accordance with exemplary aspects of the present specification, the problems with the currently available techniques may be circumvented via use of a flow conditioning device 112. In a presently contemplated configuration, the flow conditioning device 112 is positioned upstream the wet gas compressor 101. Furthermore, the flow conditioning device 112 may be configured to condition the wet gas stream 114 so as to break or reduce the size of the large liquid droplets in the wet gas stream into smaller liquid droplets. In one example, the flow conditioning device 112 may be a flow conditioning nozzle that is disposed within the pipe section 110, as depicted in FIG. 1. It may be noted that the terms "flow conditioning device" and "flow conditioning nozzle" may be used interchangeably in the present specification. In another example, the flow conditioning nozzle 112 may be disposed within the inlet section 106 of the wet gas compressor 101.

The flow conditioning nozzle 112 may be configured to receive the wet gas stream 114 from the oil and gas well. In one embodiment, the flow conditioning device 112 is designed to have cross sectional area of varying dimensions. Further, the flow conditioning nozzle 112 having the varied cross sectional area may be configured to create a differential velocity between the liquid droplets and the gas flow in the wet gas stream 114. This differential velocity is used to break the liquid droplets into smaller droplets. The aspect of conditioning the liquid droplets in the wet gas stream 114 will be described in greater detail with reference to FIG. 2. In accordance with other aspects of the present specification, the flow conditioning device 112 may be an integral part of the pipe section 110 and/or the inlet scroll 108. In another embodiment, one large flow conditioning nozzle 112 may be disposed within the pipe section 110 and/or the inlet scroll 108. Alternatively, a plurality of smaller nozzles may be arranged circumferentially within the inlet scroll 108 and/or the pipe section 110.

Figure 2:
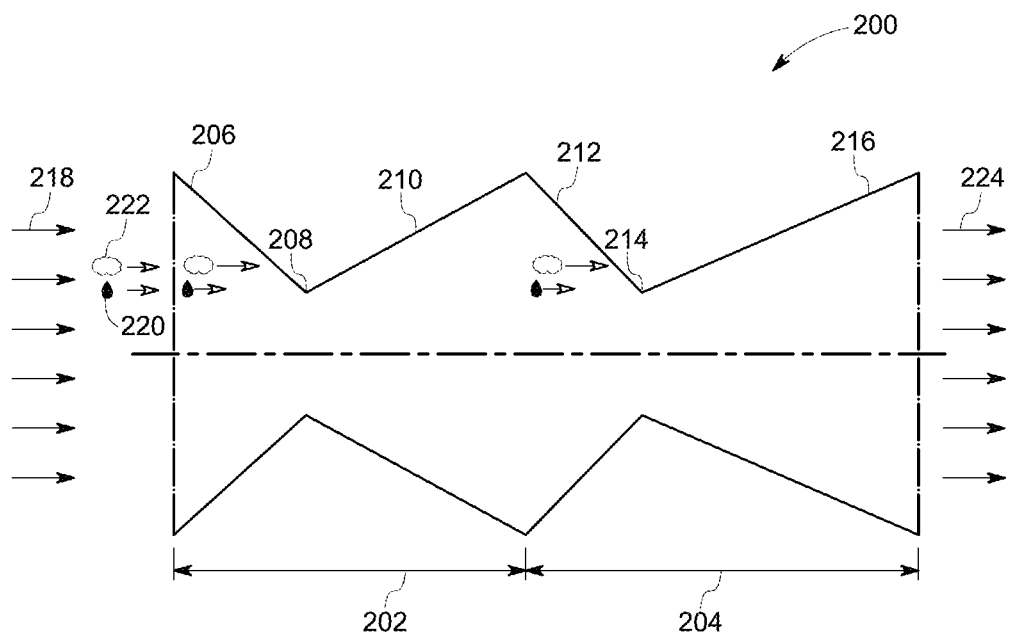
FIG. 2 is a diagrammatical representation of one embodiment of a flow conditioning device, in accordance with aspects of the present specification.

Referring to FIG. 2, one embodiment of a flow conditioning nozzle 200, in accordance with aspects of the present specification, is depicted. It may be noted that the reference numeral 200 may be representative of the flow conditioning device 112 of FIG. 1. In accordance with exemplary aspects of the present specification, the flow conditioning nozzle 200 having a varied cross-sectional area may be configured to process a wet gas stream 218 to reduce the size of a plurality of liquid droplets 220 in the wet gas stream 218. Reference numeral 218 is general representation of the wet gas stream having the plurality of liquid droplets 220 and gas flow 222. In one embodiment, the flow conditioning nozzle 200 may be formed by coupling two convergent-divergent (CD) nozzles back-to-back. In one example, the CD nozzles may include de Laval nozzles.

In a presently contemplated configuration, the flow conditioning nozzle 200 may include a first segment 202 and a second segment 204 that are coupled to each other, as depicted in FIG. 2. Moreover, in one embodiment, the flow conditioning nozzle 200 may be disposed between an outlet of a pipe section and an inlet of a wet gas compressor. Accordingly, in one embodiment, the first segment 202 may be coupled to a pipe section, such as the pipe section 110 (see FIG. 1) to receive the wet gas stream 218 from an oil and gas well. Similarly, the second segment 204 may be coupled to an inlet section, such as the inlet section 106 (see FIG. 1) of the compressor to provide a processed wet gas stream to a compressor, such as the wet gas compressor 101 (see FIG. 1). In one example, the first segment 202 may be representative of a first CD nozzle, while the second segment 204 may be representative of a second CD nozzle. It may be noted that the flow conditioning nozzle 200 may include two or more segments to reduce the size of the liquid droplets 220 in the wet gas stream 218 to a desired size.

The first segment 202 may include a first convergent section 206 and a first divergent section 210. Also, the first segment 202 may include a first throat section 208 that is positioned between the first convergent section 206 and the first divergent section 210. The first convergent section 206 may include a section of the first segment 202 having a decreasing cross-sectional area. Also, the first divergent section 210 of the first segment 202 may include a section having an increasing cross-sectional area. In certain embodiments, the first throat section 208 may have a determined length. Also, the first throat section 208 may have a substantially uniform cross-sectional area. Although, the embodiment of FIG. 2 depicts use of a first throat section 208 between the first convergent section 206 and the first divergent section 210, in certain embodiments, the first convergent section 206 may be directly coupled to the first divergent section 210 without use of the first throat section 208.

In a similar fashion, the second segment 204 may include a second convergent section 212 and a second divergent section 216. Also, the second segment 204 may include a second throat section 214 that is positioned between the second convergent section 212 and the second divergent section 216. The second convergent section 212 may include a section of the second segment 204 having a decreasing cross-sectional area. Also, the second divergent section 216 may include a section of the second segment 204 having an increasing cross-sectional area. In certain embodiments, the second throat section 214 may have a determined length. In addition, the second throat section 214 may have a substantially uniform cross-sectional area. Although, the embodiment of FIG. 2 depicts use of a second throat section 214 between the second convergent section 212 and the second divergent section 216, in certain embodiments, the second convergent section 212 may be directly coupled to the second divergent section 216 without use of the second throat section 214.

It may be noted that the length of the sections 206, 208, 210, 212, 214, 216 as well as angles of increasing and decreasing cross-sectional areas of these sections 206, 208, 210, 212, 214, 216 may vary, and is not limited to the lengths and angles depicted in FIG. 2. Also, it may be noted that the sections 206, 208, 210, 212, 214, 216 may be symmetric or asymmetric. In one embodiment, the flow conditioning nozzle 200 may be circular and axis-symmetric. It may be noted that other configurations of the flow conditioning nozzle 200 are also contemplated.

As noted hereinabove, the sequence of convergent and divergent sections in the flow conditioning nozzle 200 may be employed to provide flow acceleration and/or deceleration to the wet gas stream 218. The sequence of acceleration and/or deceleration of the wet gas stream 218 in turn promotes a non-zero differential velocity between the plurality of liquid droplets 220 and the gas flow 222 in the wet gas stream 218. The wet gas stream 218 is channeled to the flow conditioning nozzle 200, where the speed of the wet gas stream may be largely subsonic. Also, the liquid droplets 220 in the wet gas stream 218 have a first size.

In accordance with an aspect of the present specification, the speed of the wet gas stream 218 may be increased as the wet gas stream 218 is channeled through the decreasing cross-sectional area of the first convergent section 206. This increase in the speed of the wet gas stream 218 may result in acceleration of the liquid droplets 220 and the gas flow 222 in the wet gas stream 218. However, the gas flow 222 may be accelerated to a greater extent in comparison to the acceleration of the liquid droplets 220 due to higher density of the liquid droplets 220. This difference in acceleration in turn creates a first differential velocity between the liquid droplets 220 and the gas flow 222 in the wet gas stream 218. The first differential velocity may also be referred to as a slip velocity between the liquid droplets 220 and the gas flow 222. Further, if this first differential velocity exceeds a first threshold value or critical value, the liquid droplets 220 may be broken to droplets having a second size. In one example, the second size may be smaller than the first size of the liquid droplets 220.

Moreover, the wet gas stream 218 may be channeled further from the first convergent section 206 to the first divergent section 210. In one embodiment, the wet gas stream 218 may be channeled to the first divergent section 210 via the first throat section 208. The increasing cross-sectional area of the first divergent section 210 results in expansion of the gas flow in the wet gas stream 218, which in turn reduces the speed of the wet gas stream 218. Consequently, the velocity of the liquid droplets 220 and the gas flow 222 in the wet gas stream 218 may be reduced or decelerated in the first divergent section 210. Thus, the speed of the wet gas stream 218 may be brought back to or maintained at a subsonic level in the first divergent section 210. In one example, the wet gas stream 218 may be maintained at the subsonic level to prevent high pressure and/or low pressure losses of the wet gas stream 218 in the flow conditioning nozzle 200. In the first divergent section 210, the liquid droplets 220 in the wet gas stream 218 may have the second size.

In addition, as the wet gas stream 218 passes through the first divergent section 210 and is channeled to the second convergent section 212, the speed of the wet gas stream 218 may be increased once again in the decreasing cross-sectional area of the second convergent section 212. This increase in the speed of the wet gas stream 218 may reaccelerate the liquid droplets 220 and the gas flow 222 in the wet gas stream 218. Although the size of the liquid droplets 220 is reduced from the first size to the second size, the density of the liquid droplets 220 may still be higher than the density of the gas flow 222. Therefore, the acceleration of the gas flow 222 will be higher than the acceleration of the liquid droplets 220. This difference in accelerations of the gas flow 222 and the liquid droplets 220 in turn creates a second differential velocity between the liquid droplets 220 and the gas flow 222 in the wet gas stream 218. Further, if this second differential velocity exceeds a second threshold value or critical value, the liquid droplets 220 may be broken to droplets having a third size. In one example, the third size may be smaller than the second size of the liquid droplets 220.

The wet gas stream 218 may subsequently be conveyed to the second divergent section 216. In one embodiment, the wet gas stream 218 may be conveyed to the second divergent section 216 via the second throat section 214. Here again, the increasing cross-sectional area of the second divergent section 216 may decelerate the liquid droplets 220 and the gas flow 222 in the wet gas stream 218. Also, the speed of the wet gas stream 218 may be brought back to or maintained at the subsonic level in the second divergent section 216. Reference numeral 224 is general representation of a wet gas stream having liquid droplets of a smaller size. Further, the wet gas stream 218 having the liquid droplets of the third size may be provided to the inlet section of a compressor.

Thus, use of the flow conditioning nozzle 200 to condition the wet gas stream 218 prior to being supplied to a compressor aids in minimizing the impact of the liquid droplets 220 in the wet gas stream 218 on the impellers and/or other surfaces in the compressor. In particular, as the flow conditioning nozzle 200 aids in minimizing the size of the liquid droplets 220, the interaction between the liquid droplets 220 and the impellers and/or other surfaces of the compressor is substantially reduced.

Figure 3:
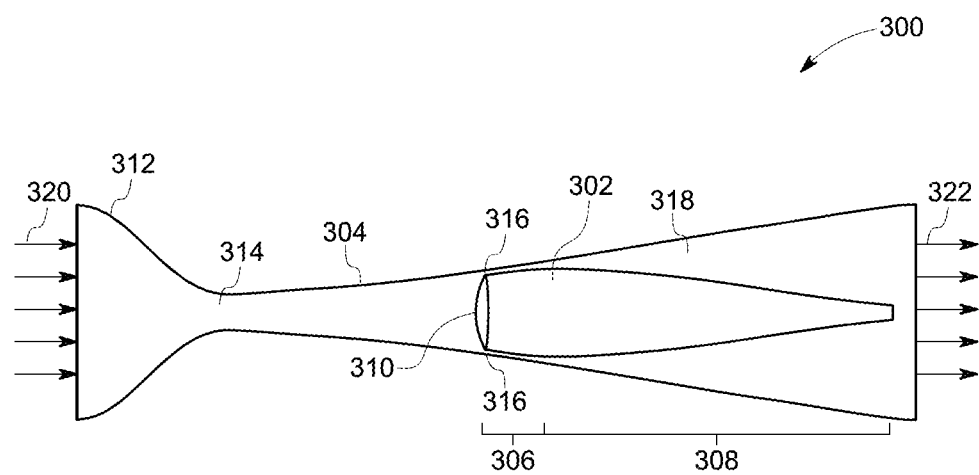
FIG. 3 is a diagrammatical representation of another embodiment of a flow conditioning device, in accordance with aspects of the present specification.
Figure 4:
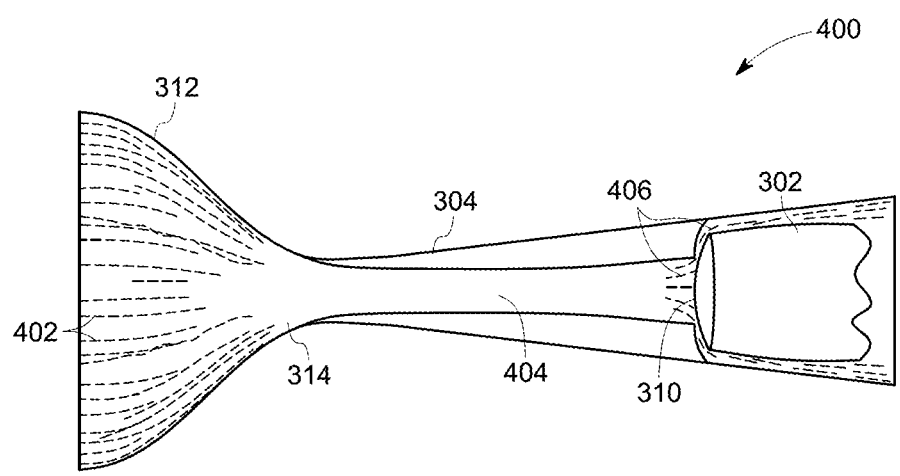
FIG. 4 is a diagrammatical representation of a portion of the flow conditioning device of FIG. 3 including a wet gas stream, in accordance with aspects of the present specification.

Referring to FIG. 3, another embodiment of a flow conditioning nozzle 300, in accordance with aspects of the present specification, is depicted. Further, FIG. 4 is diagrammatical representation 400 of a portion of the flow conditioning nozzle 300 of FIG. 3 including a wet gas stream 320. The flow conditioning nozzle 300 is similar to the flow conditioning nozzle 200 of FIG. 2. Particularly, a first segment of the nozzle 300 includes a first convergent section 312, a first throat section 314, and a first divergent section 304. However, a second segment of the nozzle 300 may be formed by disposing a wedge 302 within a central body of the first divergent section 304. More specifically, the wedge 302 may be positioned at a determined location within the first divergent section 304 of the flow conditioning nozzle 300. The wedge 302 may include a head portion 306 and a tapering tail portion 308 coupled to the head portion 306, as depicted in FIG. 3. In one embodiment, the wedge 302 may be positioned in the first divergent section 304 such that a narrow annular passage or aperture is formed around the head portion 306 of the wedge 302. This annular passage may be configured to allow the wet gas stream 320 to pass through around the wedge 302. This narrow annular passage or aperture around the head portion 306 may be referred to as a second convergent section 316 of the nozzle 300. Further, at the tapering tail portion 308, this annular passage widens and may be referred to a second divergent section 318 of the nozzle 300.

In the exemplary embodiment of FIG. 3, the head portion 306 of the wedge 302 may include a closed front end 310 facing the first convergent section 312 and/or a first throat section 314 of the flow conditioning nozzle 300. It may be noted that liquid droplets in the wet gas stream 320 impinge on the closed front end 310 of the head portion 306. Accordingly, the closed front end 310 of the head portion 306 may be coated with an erosion resistant material to minimize the impact of the liquid droplets on the the head portion 306 of the wedge 302. In one example, placement of the wedge 302 may result in another annular convergent-divergent (CD) nozzle in the flow conditioning nozzle 300.

During operation, the wet gas stream 320 may be channeled into the first convergent section 312 of the flow conditioning nozzle 300. The speed of the wet gas stream 320 may be largely subsonic. Also, the liquid droplets in the wet gas stream 320 have a first size.

Upon channeling the wet gas stream 320 to the first convergent section 312 of the flow conditioning nozzle 300, the speed of the wet gas stream 320 may be increased as the wet gas stream 320 is channeled through the decreasing cross-sectional area of the first convergent section 312. This increase in the speed of the wet gas stream 320 may result in acceleration of the liquid droplets and the gas flow in the wet gas stream 320. However, the gas flow may be accelerated to a greater extent in comparison to the acceleration of the liquid droplets in the wet gas stream 320 due to higher density of the liquid droplets. This difference in acceleration in turn may create a first differential velocity between the liquid droplets and the gas flow in the wet gas stream 320. Further, if this first differential velocity exceeds a first threshold value or critical value, the liquid droplets may be broken into droplets having a second size. In one example, the second size may be smaller than the first size of the liquid droplets. These broken liquid droplets in the wet gas stream 320 are represented by lines 402 in FIG. 4.

Further, the wet gas stream 320 may be channeled to the first divergent section 304. In one embodiment, the wet gas stream 320 may be channeled to the first divergent section 304 via the first throat section 314. The increasing cross-sectional area of the first divergent section 304 results in expansion of the gas flow in the wet gas stream 320, which in turn reduces the speed of the wet gas stream 320. Consequently, the velocity of the liquid droplets and the gas flow in the wet gas stream 320 may be reduced or decelerated in the first divergent section 304. Thus, the speed of the wet gas stream 320 may be brought back to or maintained at subsonic level in the first divergent section 304. In one example, the wet gas stream 320 is maintained at the subsonic level to prevent high pressure and/or low pressure losses of the wet gas stream 320 in the flow conditioning nozzle 300. In the first divergent section 304, the liquid droplets in the wet gas stream 320 may have the second size. The flow of wet gas stream 320 in the first divergent section 304 is represented by a continuous solid path 404 in FIG. 4.

Moreover, the differential velocity between the liquid droplets and the gas flow in the wet gas stream 320 may soon attain a zero value as the wet gas stream is channeled through the first divergent section 304. Therefore, it is desirable to reaccelerate the gas flow and distribute the liquid droplets in the wet gas stream 320. In one embodiment, the head portion 306 of the wedge 302 may aid in distributing the liquid droplets towards an outer radius of the wedge 302 and accelerating the gas flow. Particularly, the wet gas stream 320 may impinge on the closed front end 310 of the wedge 302 and may be channeled through the second convergent section 316 of the nozzle 300. In the second convergent section 316, the speed of the wet gas stream may increase again due to the narrow annular passage or aperture around the head portion 306 of the wedge 302. This increase in the speed of the wet gas stream 320 may reaccelerate the liquid droplets and the gas flow in the wet gas stream 320. The acceleration of the gas flow is higher than the acceleration of the liquid droplets. This difference in acceleration of the gas flow and the liquid droplets in the wet gas stream 320 in turn creates a second differential velocity between the liquid droplets and the gas flow in the wet gas stream 320. Further, if this second differential velocity exceeds a second threshold value or critical value, the liquid droplets may be broken into droplets having a third size. In one example, the third size of the droplets may be smaller than the second size of the droplets. These broken liquid droplets in the second convergent section 316 are represented by lines 406 in FIG. 4.

Furthermore, the wet gas stream 320 may be conveyed to the second divergent section 318. The widening annular passage at the tapering tail portion 308 of the wedge 302 may aid in decelerating the liquid droplets and the gas flow in the wet gas stream 320. Also, the speed of the wet gas stream 320 may be brought back to or maintained at the subsonic level in the second divergent section 318. In addition, a wet gas stream having the liquid droplets of the third size may be provided to the inlet section of the compressor.

Figure 5:
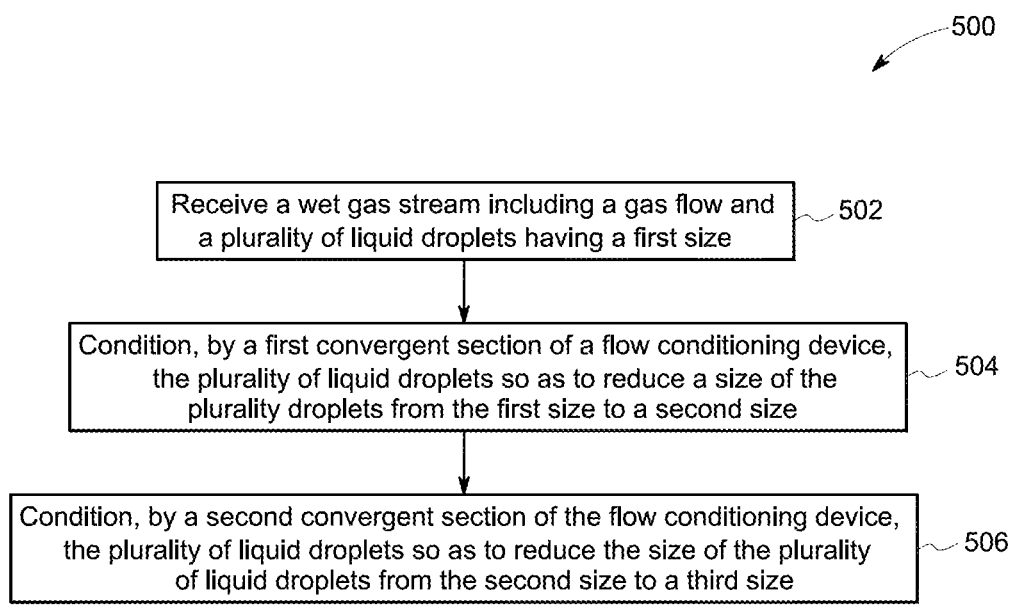
FIG. 5 is a flow cart illustrating a method for conditioning a flow of a wet gas stream including a plurality of liquid droplets, in accordance with aspects of the present specification.

Turning now to FIG. 5, a flow cart 500 illustrating a method for conditioning a flow of a wet gas stream, in accordance with aspects of the present specification, is depicted. For ease of understanding, the method of FIG. 5 will be described with reference to the components of FIGS. 1-4. The method begins at step 502, where a wet gas stream including a plurality of liquid droplets having a first size and the gas flow is received. A first convergent section 206 of a flow conditioning nozzle 200 may be used to receive the wet gas stream 218 from an oil and gas well.

Subsequently, at step 504, the plurality of liquid droplets 220 in the wet gas stream 218 may be conditioned to reduce the size of the liquid droplets 220 from the first size to a second size. Particularly, as the wet gas stream 218 is channeled through the flow conditioning nozzle 200, the speed of the wet gas stream 218 may be increased in a decreasing cross-sectional area of the first convergent section 206. This increase in the speed of the wet gas stream 218 may result in the acceleration of the liquid droplets 220 and the gas flow 222 in the wet gas stream 218. This in turn creates a first differential velocity between the liquid droplets 220 and the gas flow 222 in the wet gas stream 218. Further, if this first differential velocity exceeds a first threshold value, the liquid droplets 220 may be broken into droplets having a second size. In one example, the second size of the liquid droplets may be smaller than the first size of the liquid droplets.

Furthermore, at step 506, the plurality of liquid droplets 220 in the wet gas stream 218 may be conditioned again to reduce the size of the liquid droplets 220 from the second size to a third size. Accordingly, the wet gas stream 218 may be conveyed to the first divergent section 210 from the first convergent section 206. In the first divergent section 210, the liquid droplets 220 and the gas flow 222 in the wet gas stream 218 may be decelerated due to an increasing cross-sectional area of the first divergent section 210. Further, as the wet gas stream 218 passes through the first divergent section 210 and is channeled to the second convergent section 212, the speed of the wet gas stream 218 may be increased again in a decreasing cross-sectional area of the second convergent section 212. This increase in the speed of the wet gas stream 218 may result in reacceleration of the liquid droplets 220 and the gas flow 222 in the wet gas stream 218. Moreover, a second differential velocity may be created between the liquid droplets 220 and the gas flow 222 in the wet gas stream 218. Also, if this second differential velocity exceeds a second threshold value, the liquid droplets 220 may be broken into droplets having the third size. In one example, the third size of the droplets 220 may be smaller than the second size of the droplets.

Thereafter, the wet gas stream 218 may be channeled to the second divergent section 216. Here again, the increasing cross-sectional area of the second divergent section 216 aids in decelerating the liquid droplets 220 and the gas flow 222 in the wet gas stream 218. Further, the wet gas stream 224 having the liquid droplets of the third size may be provided to the inlet section 106 of the compressor 101.

The various embodiments of the exemplary system and method aid in conditioning the wet gas stream before providing the wet gas stream to one or more compressors. Use of the conditioned wet gas stream in turn minimizes the impact of the liquid droplets in the wet gas stream on the impellers, thereby preventing erosion or embrittlement of the impellers in the compressors. Also, the exemplary system and method aid in improving the performance, reliability, and lifetime of the compressors.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A flow conditioning device for conditioning a wet gas stream having a plurality of liquid droplets and a gas flow, comprising:
    a first segment comprising a first convergent section configured to break the plurality of liquid droplets from a first size to a second size;
    a second segment coupled to the first segment and comprising a second convergent section configured to break the plurality of liquid droplets from the second size to a third size;
    a first divergent section operatively coupled between the first convergent section and the second convergent section and configured to decelerate the wet gas stream; and
    a wedge disposed at a central body of the first divergent section to form the second segment.

2. The flow conditioning device of claim 1, wherein the first convergent section is configured to accelerate the wet gas stream so as to create a first differential velocity between the plurality of liquid droplets and the gas flow in the wet gas stream.

3. The flow conditioning device of claim 2, wherein the first convergent section is configured to break the plurality of liquid droplets from the first size to the second size based on the first differential velocity.

4. The flow conditioning device of claim 1, wherein the first divergent section is coupled to the first convergent section via a first throat section.

5. The flow conditioning device of claim 1, wherein the second convergent section is configured to reaccelerate the wet gas stream so as to create a second differential velocity between the plurality of liquid droplets and the gas flow in the wet gas stream.

6. The flow conditioning device of claim 5, wherein the second convergent section is configured to break the plurality of liquid droplets from the second size to the third size based on the second differential velocity.

7. The flow conditioning device of claim 1, wherein the second segment further comprises a second divergent section operatively coupled to the second convergent section and configured to decelerate the wet gas stream.

8. The flow conditioning device of claim 7, wherein the second divergent section is coupled to the second convergent section via a second throat section.

9. The flow conditioning device of claim 1, wherein the wedge comprises a head portion and a tapering tail portion coupled to the head portion.

10. The flow conditioning device of claim 9, wherein the head portion comprises a closed front end that is coated with an erosion resistant material.

11. A method, comprising:
    receiving a wet gas stream comprising a plurality of liquid droplets having a first size and a gas flow;
    conditioning, by a first convergent section of a flow conditioning device, the plurality of liquid droplets so as to reduce a size of the plurality of liquid droplets from the first size to a second size;
    decelerating, by a first divergent section coupled to the first convergent section, the plurality of liquid droplets having the second size; and
    conditioning, by a second convergent section coupled to the first divergent section, the plurality of liquid droplets so as to reduce the size of the plurality of liquid droplets from the second size to a third size.

12. The method of claim 11, wherein conditioning, by the first convergent section, the plurality of liquid droplets comprises accelerating the wet gas stream so as to create a first differential velocity between the plurality of liquid droplets and the gas flow in the wet gas stream.

13. The method of claim 12, further comprising breaking the plurality of liquid droplets from the first size to the second size based on the first differential velocity.

14. The method of claim 11, wherein conditioning, by the second convergent section, the plurality of liquid droplets comprises reaccelerating the wet gas stream so as to create a second differential velocity between the plurality of liquid droplets and the gas flow in the wet gas stream.

15. The method of claim 14, further comprising breaking the plurality of liquid droplets from the second size to the third size based on the second differential velocity.

16. The method of claim 11, further comprising decelerating, by a second divergent section of the flow conditioning device, the wet gas stream.

17. A system comprising:
    a compressor;
    a flow conditioning device operatively coupled to an inlet of the compressor and comprising:
    a first convergent section configured to:
    receive a wet gas stream comprising a gas flow and a plurality of liquid droplets having a first size;
    condition the plurality of liquid droplets so as to reduce a size of the plurality of liquid droplets from the first size to a second size; and
    a first divergent section coupled to the first convergent section and configured to decelerate the wet gas stream comprising the plurality of liquid droplets having the second size;
    a second convergent section coupled to the first divergent section and configured to condition the plurality of liquid droplets so as to reduce the size of the plurality of liquid droplets from the second size to a third size; and a second divergent section coupled to the second convergent section and configured to decelerate the wet gas stream.

* * * * *